United States Patent
Miller et al.

(10) Patent No.: US 12,499,171 B2
(45) Date of Patent: Dec. 16, 2025

(54) DETACHABLE BROWSER INTERFACE FOR CONTEXT-AWARE WEB SERVICES

(71) Applicant: Microsoft Technology Licensing, LLC, Redmond, WA (US)

(72) Inventors: Kyle Matthew Miller, Lynnwood, WA (US); Hariharan Ragunathan, Woodinville, WA (US); Tai Xin, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/328,172

(22) Filed: Jun. 2, 2023

(65) Prior Publication Data
US 2024/0346102 A1    Oct. 17, 2024

Related U.S. Application Data

(60) Provisional application No. 63/495,905, filed on Apr. 13, 2023.

(51) Int. Cl.
*G06F 16/957* (2019.01)
*G06F 3/0481* (2022.01)
*G06F 16/958* (2019.01)

(52) U.S. Cl.
CPC ........ *G06F 16/9577* (2019.01); *G06F 3/0481* (2013.01); *G06F 16/958* (2019.01)

(58) Field of Classification Search
CPC ... G06F 16/9577; G06F 3/0481; G06F 16/958
See application file for complete search history.

(56) References Cited

U.S. PATENT DOCUMENTS

| 2003/0202009 | A1  | 10/2003 | Kasriel |              |
|--------------|-----|---------|---------|--------------|
| 2008/0184159 | A1* | 7/2008  | Selig   | G06F 40/174  |
|              |     |         |         | 715/781      |
| 2008/0235602 | A1* | 9/2008  | Strauss | G06F 9/451   |
|              |     |         |         | 715/802      |
| 2011/0078615 | A1* | 3/2011  | Bier    | G06F 9/451   |
|              |     |         |         | 715/779      |
| 2011/0087984 | A1* | 4/2011  | Jitkoff | G06F 40/106  |
|              |     |         |         | 715/769      |
| 2013/0219299 | A1* | 8/2013  | Yerli   | G06F 9/451   |
|              |     |         |         | 715/753      |

(Continued)

FOREIGN PATENT DOCUMENTS

EP    2328080 A2    6/2011

OTHER PUBLICATIONS

International Search Report and Written Opinion received for PCT Application No. PCT/US2024/021254, Jul. 25, 2024, 14 pages.

(Continued)

*Primary Examiner* — Hope C Sheffield

(57) ABSTRACT

Systems and methods that implement a framework for providing a detachable browser interface (sidebar) for context-aware web services. The present framework allows for a user to detach the detachable sidebar from a web browser window and dock the sidebar to a desktop of an operating system. As a result, the context-aware web services of the sidebar can be used in conjunction with the web browser application and with other applications (e.g., browser or non-browser applications).

20 Claims, 14 Drawing Sheets

(56) References Cited

U.S. PATENT DOCUMENTS

2014/0164957 A1* 6/2014 Shin ..................... H04L 65/403
                                                    715/806
2022/0092133 A1* 3/2022 Devereux ............. G06F 3/0482
2022/0206677 A1* 6/2022 Zadina ................ G06F 16/9535

OTHER PUBLICATIONS

Mag, Geeker, "How to Detach & Reattach Sidebar in Microsoft Edge (In Canary)", Retrieved from the URL: https://www.youtube.com/watch?v=4UQOIAzx3Zw, Apr. 12, 2023, 2 Pages.
International Preliminary Report On Patentability received for PCT Application No. PCT/US2024/021254, Oct. 23, 2025, 08 pages.

* cited by examiner

DETACHABLE BROWSER INTERFACE FOR CONTEXT-AWARE WEB SERVICES

CROSS-REFERENCE TO RELATED APPLICATIONS

This application claims the benefit of U.S. Provisional Patent Application No. 63/495,905, titled "DETACHABLE BROWSER INTERFACE FOR CONTEXT-AWARE WEB SERVICES," filed Apr. 13, 2023, which is incorporated by reference herein in its entirety.

BACKGROUND

Web browsers are computing applications that provide access to the World Wide Web via the Internet. When a user requests a web page from a particular website, such as by sending a request with a Uniform Resource Locator (URL), the web browser retrieves the related content from a web server and displays the web page on the user's device. For instance, when the content is received from the web server, a rendering engine displays the content on a display of a computing device.

It is with respect to these and other considerations that examples have been made. In addition, although relatively specific problems have been discussed, it should be understood that the examples should not be limited to solving the specific problems identified in the background.

SUMMARY

This summary is provided to introduce a selection of concepts in a simplified form that are further described below in the Detailed Description section. This summary is not intended to identify key features or essential features of the claimed subject matter, nor is it intended as an aid in determining the scope of the claimed subject matter.

The present technology relates to systems and methods that implement a framework for providing a detachable browser interface for context-aware web services, the detachable interface sometimes referred to herein as a "sidebar". The present framework allows for a user to detach the sidebar from a web browser window and dock the sidebar to a desktop of an operating system. As a result, the context-aware web services of the sidebar can be used in conjunction with the web browser application and with other applications (e.g., browser or non-browser applications). Thus, the sidebar provides a standardized platform for multiple desktop experiences, rather than bespoke solutions built into individual applications and/or dependent on a particular web browser application.

For example, the present framework provides context about content of an active application window to a context-aware web service (sometimes referred to herein as a contextual web application). When a change of the active window is detected, context of the new active application window is obtained and provided to one or more contextual web applications. For instance, the one or more contextual web applications subscribe to receive context about an active application window. As a result, the contextual web applications are able to provide web-based services that hasten or otherwise augment completion of a task corresponding to the content of the application window with which a user is interacting.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

The accompanying drawings, which are incorporated in and constitute a part of this disclosure, illustrate various aspects of the present invention. In the drawings.

DETAILED DESCRIPTION

Figure 1A:
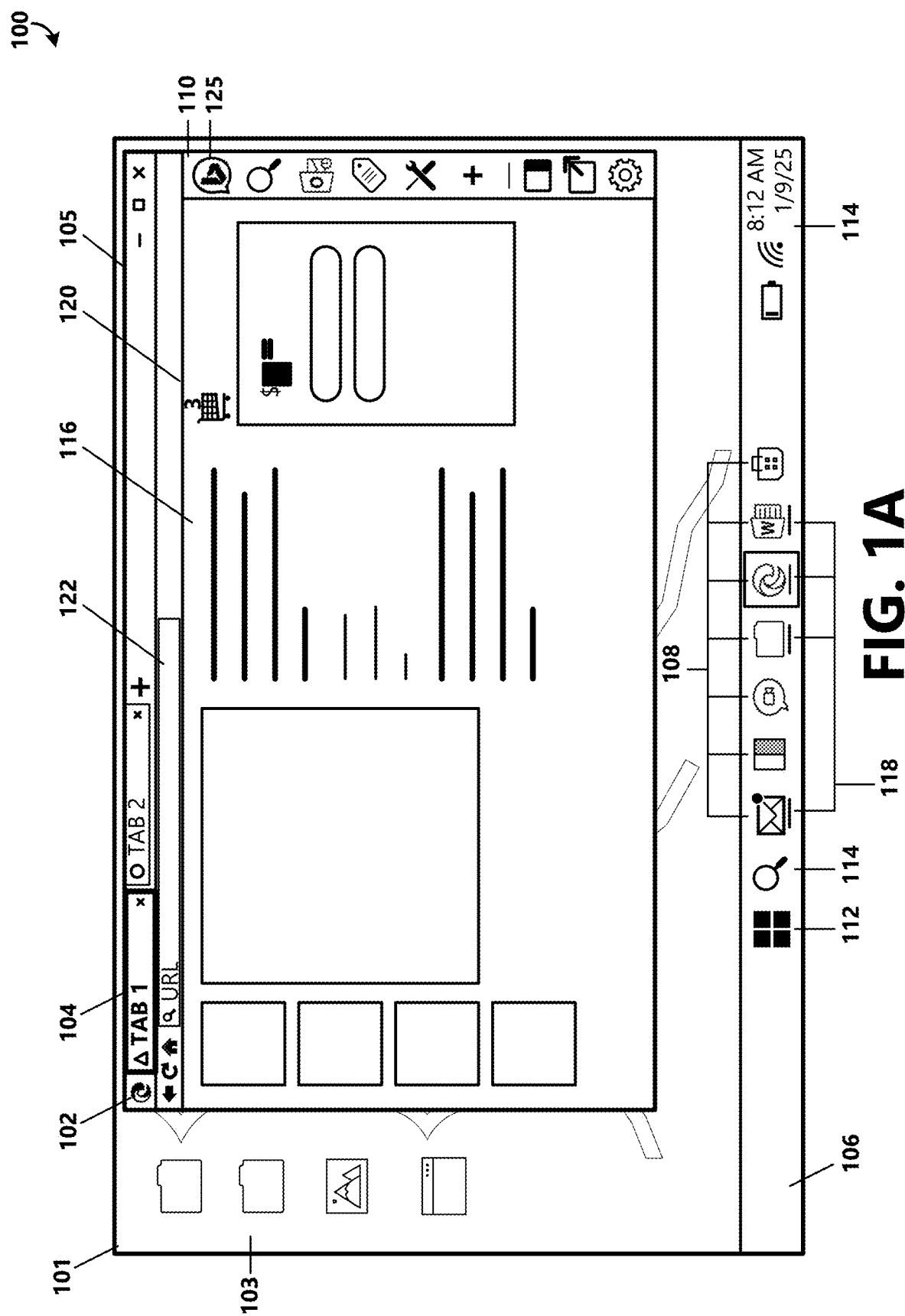
FIG. 1A depicts an example desktop and web browser with a detachable sidebar.

The following detailed description refers to the accompanying drawings. Wherever possible, the same reference numbers are used in the drawing and the following description to refer to the same or similar elements. While aspects of the technology may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the technology, but instead, the proper scope of the technology is defined by the appended claims. Examples may take the form of a hardware implementation, or an entirely software implementation, or an implementation combining software and hardware aspects. The following detailed description is, therefore, not to be taken in a limiting sense.

In some examples, a web browser includes a framework that exposes web-based applications or services that launch within the web browser and are displayed alongside web page content. Some web-based applications or services are contextually-aware services that use context about the web page content to generate responsive data. As an example, a web-based application or service provides a feature that summarizes a current web page through machine-learning (ML) or artificial intelligence (AI) models. Such web browser features, however, are generally limited to a specific instance of a web browser, which may require or utilize redundant resources for each of multiple web browser instances or windows.

The present technology, among other things, introduces a framework that improves interfacing with multiple application windows to provide context to contextual web applications in a sidebar that is detachable from the web browser. For instance, the detachable sidebar may be initially displayed as part of, or attached to, a web browser window. The sidebar may then be detached from the web browser window and docked or attached to a desktop provided by the operating system. Docking of the sidebar may be done in a manner that causes the operating system to redraw the desktop to include the sidebar and shift or modify the workspace of the desktop based on the position of the sidebar. The docked sidebar may then not occlude other windows displayed in the desktop and additionally remain unoccluded from other windows. While in the docked state, the present framework tracks changes in an active window and a last active browser window, which allows for correct context about content in the active window to be fed to the contextual web applications of the sidebar. Thus, a single docked sidebar may be used to access context from multiple different windows, which results in a conservation of computing resources as well as an enhanced efficiency of display resources. While the sidebar is docked to the desktop, the sidebar may be detached from the desktop and reattached to a web browser window as well to revert to the browser window-specific functionality of the sidebar. For instance, the sidebar and contextual web applications can quickly revert to obtained context when the sidebar is reattached to the browser.

FIG. 1A depicts an example operating system desktop 101 with a web browser 102 including a detachable interface in the form of a sidebar 110 for exposing context-aware web services or applications (herein referred to as contextual web applications 125). The desktop 101 provides a graphical user interface (GUI) for interacting with applications 108 (such as the web browser 102 and other non-browser applications), folders, documents, and standard features of a computing device's operating system. For instance, the desktop 101 includes a workspace 103 that serves as a primary area, or "workspace," for a user to interact with applications 108, manage files and folders, and the like. For instance, the workspace 103 may be the area of the desktop 101 where application windows may be displayed. The desktop 101 further includes a taskbar 106 that displays currently running and/or pinned application indicators 118, and a start button 112 that provides access to various system features, settings, shortcuts to frequently used applications 108, etc. The depicted taskbar 106 includes additional features 114, such as a system clock, volume control, network connectivity, battery status, a search button or bar, and icons for system utilities and other applications 108. In some examples, system notifications (e.g., incoming messages or updates) are displayed in or expanded from the taskbar 106. The taskbar 106 may not be considered part of the workspace 103 (e.g., windows may not overlap or occlude the taskbar 106).

A web browser application frame 105 (referred to herein as an "application window" or simply "window") provides a user interface including various features of the web browser 102, such as a tab indicator 104 that indicates a particular web page 116 that is being displayed. The web browser application window 105 also includes a search or uniform resource locator (URL) bar 122 that includes a current URL of the web page 116 that is being displayed by the web browser 102. Other user interface elements, such as a back, reload, and home button are also presented by the web browser 102. The web browser 102 displays the web page 116 in a main browsing frame or primary display area 120 of the web browser application window 105.

The web browser 102 further includes a sidebar 110 that provides a plurality of icons corresponding to various web applications, including one or more contextual web applications 125, and other features and functionalities of the web browser 102. Although the sidebar 110 is shown as being located on the right-hand side of the web browser application window 105, the sidebar 110 can be positioned in different locations in other examples. As will be described in further detail below, a contextual web application 125 is a web application that receives and processes context information about or associated with an active window (e.g., of the web browser 102, another web browser application 108, or a non-browser desktop application 108) and generates responsive data based on the context. In some examples, the contextual web application 125 is provided with contextual information regarding the active window's content, instead of the actual active window content in its entirety. When an icon associated with a contextual web application 125 is selected (e.g., via a hover, click, keyboard shortcut, voice command) from the sidebar 110, a sidebar frame 140 (depicted in FIG. 1B) is activated and displays content 142 associated with the web application, contextual web application 125, and/or other feature/functionality corresponding to the selected icon.

As an example, when an icon corresponding to a contextual web application 125 providing a shopping service is selected from the sidebar 110, content 142 from the corresponding shopping service for a product the user is shopping for is displayed in real-time in the sidebar frame 140. The content 142 from the shopping service includes content based on context of the web page 116 being displayed in the primary display area 120. As an example, the web page 116 may be a product page of a retailer for a particular product, such as headphones, where the product name and/or model may be extracted as context by a contextual data handler 216 (described below with reference to FIG. 2). That context (e.g., headphones name and/or model) is provided to the contextual web application 125 (shopping service) by the contextual data handler 216. The shopping service then uses that context to generate additional data. In this example, the shopping service identifies other web pages or retailers selling the same product (e.g., other retailers selling the same headphones), determines price history, and/or identifies coupons available for the headphones at one or more retailers. That additional data is communicated back to the web browser 102 from the shopping service and displayed within the sidebar frame 140.

As another example, when an icon corresponding to a contextual web application 125 providing a chatbot feature is selected, a conversational interface is provided in the sidebar frame 140 to provide information or assistance to users through natural language conversations. The chatbot functionality is integrated with web search functionality and, in some examples, with a remote AI model, such as a generative ML model trained to understand and generate sequences of tokens, which may be in the form of natural language (e.g., human-like text). In various examples, the generative AI/ML model understands complex intent, cause and effect; performs language translation, semantic search classification, complex classification, text sentiment, summarization, summarization for an audience; and/or provides other natural language capabilities. An example generative AI/ML model includes the GPT-3 model from OpenAI. For instance, the chatbot contextual web application 125 receives an input from the user via the conversational interface including a question, "How do I use this?". Context of the web browser application window 105 is extracted and provided to chatbot contextual web application 125. For instance, the headphones product page in the above example may continue to be the web page 116 displayed in the primary display area 120 of the web browser application window 105, where the chatbot contextual web application 125 uses that context to generate additional data. A response (content 142) including an answer associated with how to use the product the user is shopping for is displayed in real-time in the sidebar frame 140. In this example, the chatbot contextual web application 125 may identify other web pages with "how to" or "instructions" descriptions in relation to the headphones, where that additional data is communicated back to the web browser 102 from the chatbot contextual web application 125 and displayed within the sidebar frame 140.

Figure 1B:
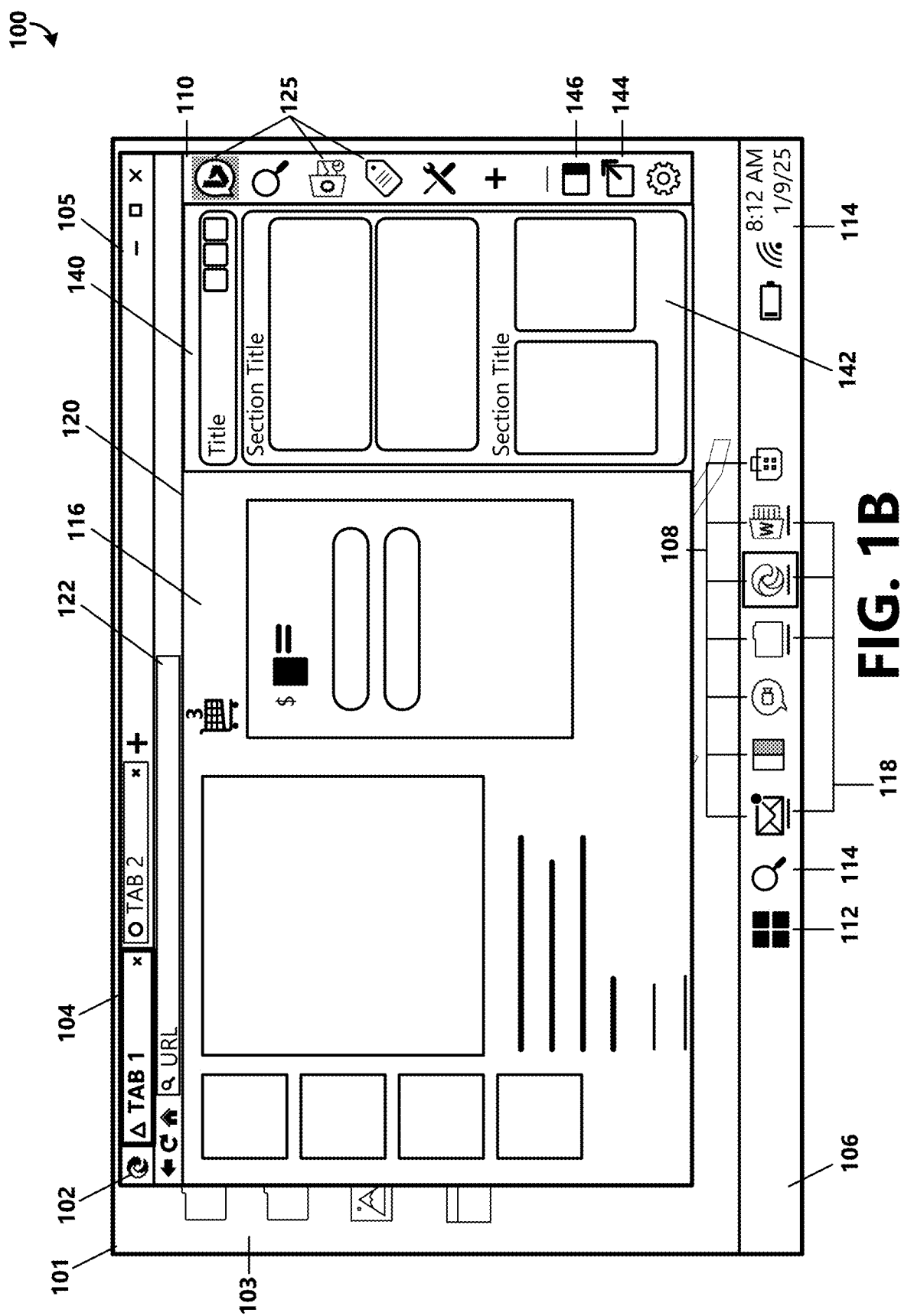
FIG. 1B depicts an example sidebar frame extending from the sidebar.

With continued reference to FIG. 1B, an example sidebar frame 140 is shown, where the sidebar frame 140 is a user interface pane that expands out from the sidebar 110, e.g., when an icon associated with a contextual web application 125 is selected. In some examples, the sidebar frame 140 is provided as an overlay in front of the primary display area 120 of the web browser application window 105, where the sidebar frame 140 at least partially occludes a web page 116 displayed in the primary display area 120. In other examples, and as illustrated, activation of the sidebar frame 140 causes the primary display area 120 to responsively shrink (e.g., resize and reposition) to make room for the sidebar frame 140 such that the sidebar frame 140 does not occlude the web page 116 displayed in the primary display area 120. When an icon is deselected, or a collapse input is received, the sidebar frame 140 collapses or minimizes such that it is no longer displayed in the web browser application window 105. In some examples, the primary display area 120 then responsively expands (e.g., resizes and repositions) to fill the space of the web browser application window 105 previously occupied by the sidebar frame 140.

Other icons in the sidebar 110 correspond to other features and functionalities, such as different web applications, a sidebar home, browser utilities, user profile settings, adding/managing web applications, etc. In some examples, the sidebar 110 further includes an auto-hide command 146 corresponding to a feature that hides the sidebar 110 when it is not in use. When enabled, the sidebar 110 automatically collapses when the user is not using it and will reappear when the user moves a cursor to the edge of the user interface pane where the sidebar 110 is normally located or otherwise indicates that he wants to view the sidebar 110. In some examples, the user may hover the cursor on or near the edge for a moment for the sidebar 110 to fully appear.

Figure 1C:
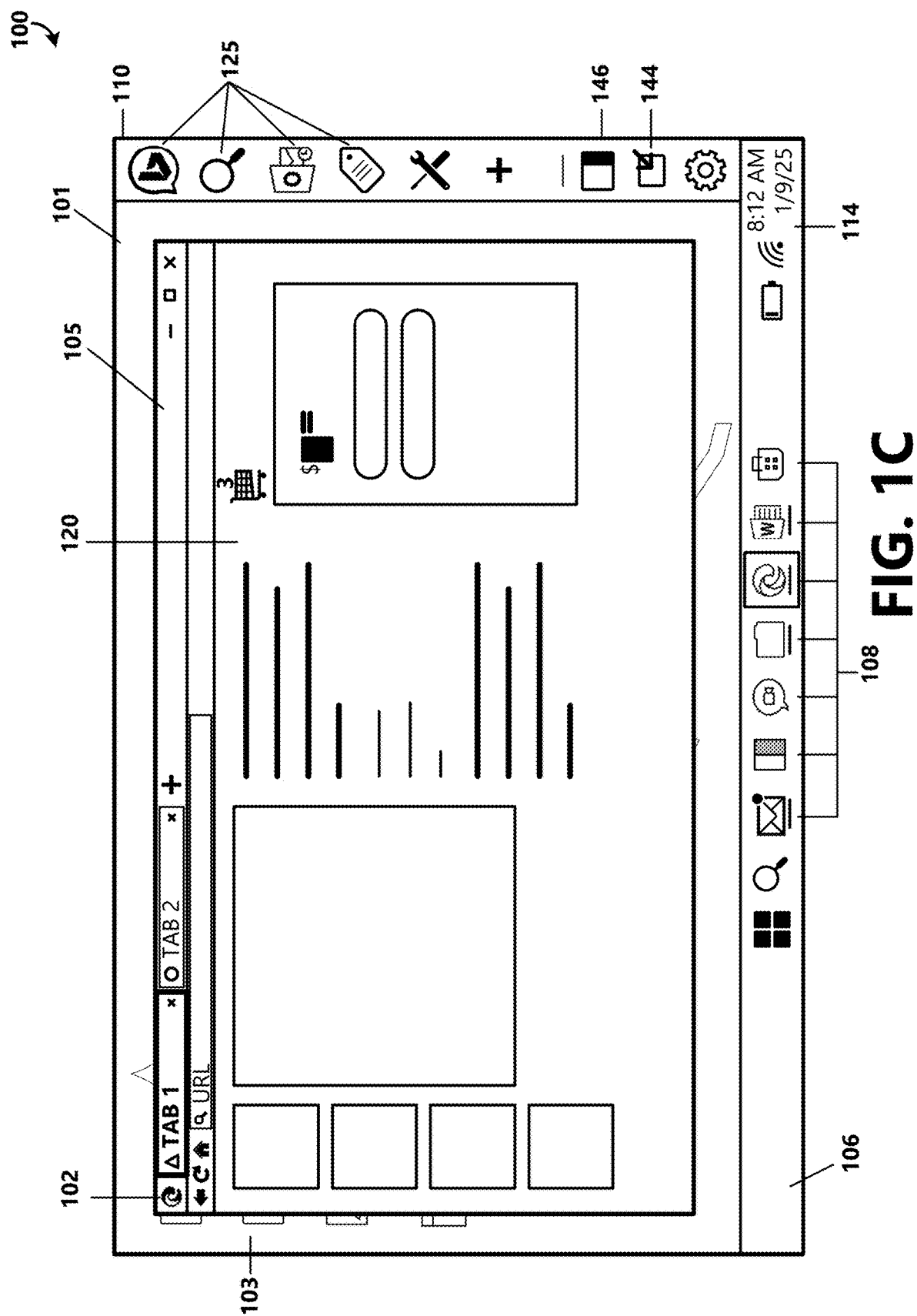
FIG. 1C depicts the sidebar selectively detached from the web browser and docked to the desktop according to an example.

In further examples, the sidebar 110 includes a user interface element corresponding to a detachment command 144. The detachment command 144 corresponds to a detached sidebar feature that toggles docking of the sidebar 110. In an example implementation, selection of the detachment command 144 causes the sidebar 110 to be toggled from being docked to the web browser application window 105 to being docked to the desktop 101 of the operating system. For instance, when the sidebar 110 is docked to the web browser application window 105 and the detachment command 144 is selected (or when the sidebar 110 is selected and dragged from the web browser application window 105), the sidebar 110 detaches from the web browser application window 105 and docks to the desktop 101, and as depicted in FIG. 1C. As a result, the contextual web applications 125 in the sidebar 110 may be used in conjunction with any desktop application 108 without sacrificing features or functionality. When the sidebar is docked to the desktop 101 and the detachment command 144 is selected, the sidebar 110 detaches from the desktop 101 and is redocked to the web browser application window 105.

In some implementations, when the sidebar 110 is detached from the web browser application window 105, the desktop 101 is redrawn to create separate user interface zones for standard desktop applications 108 and the sidebar 110 by resizing the workspace 103. Redrawing the desktop 101 may include updating the graphical elements of the desktop GUI by recomputing the layout, appearance, and/or visual properties of the GUI. Resizing the workspace 103 and creating a dedicated display space for the sidebar 110 in the desktop 101 may require that all or some of the application windows displayed in the workspace 103 prior to the docking of sidebar 110 to the desktop 101 be redrawn. As an example, each open window may be resized and redrawn by an amount of offset caused by the display of the docked sidebar 110. For instance, where the sidebar 110 has a docked width of 100 pixels, each of the open windows may have their widths resized by 100 pixels. In some examples, windows that are minimized are also resized and redrawn during the desktop-redrawing process. Accordingly, the redrawing process may consume additional graphics processing resources. Thus, by limiting redrawing of the desktop 101 to specific events, such as detachment of the sidebar 110 from the web browser window 105, the number of redrawing events that occur may be minimized or limited.

Separating the workspace 103 into zones prevents contextual web applications 125 in the sidebar 110 from obscuring other desktop user interfaces and enhances multitasking scenarios. For instance, when the sidebar 110 is docked to a right or left side of the desktop 101, the workspace 103 shrinks horizontally such that the sidebar 110 and one or more windows of desktop applications 108 are displayed concurrently. As illustrated in FIG. 1C, the sidebar 110 is docked to a right side of the desktop 101 and the active web browser application window 105 is displayed in the shrunken workspace 103. The user may then interact with multiple windows in the workspace 103 without occluding the docked sidebar 110 (or being occluded thereby), which enhances the use of the sidebar 110 for multitasking activities.

Figure 1D:
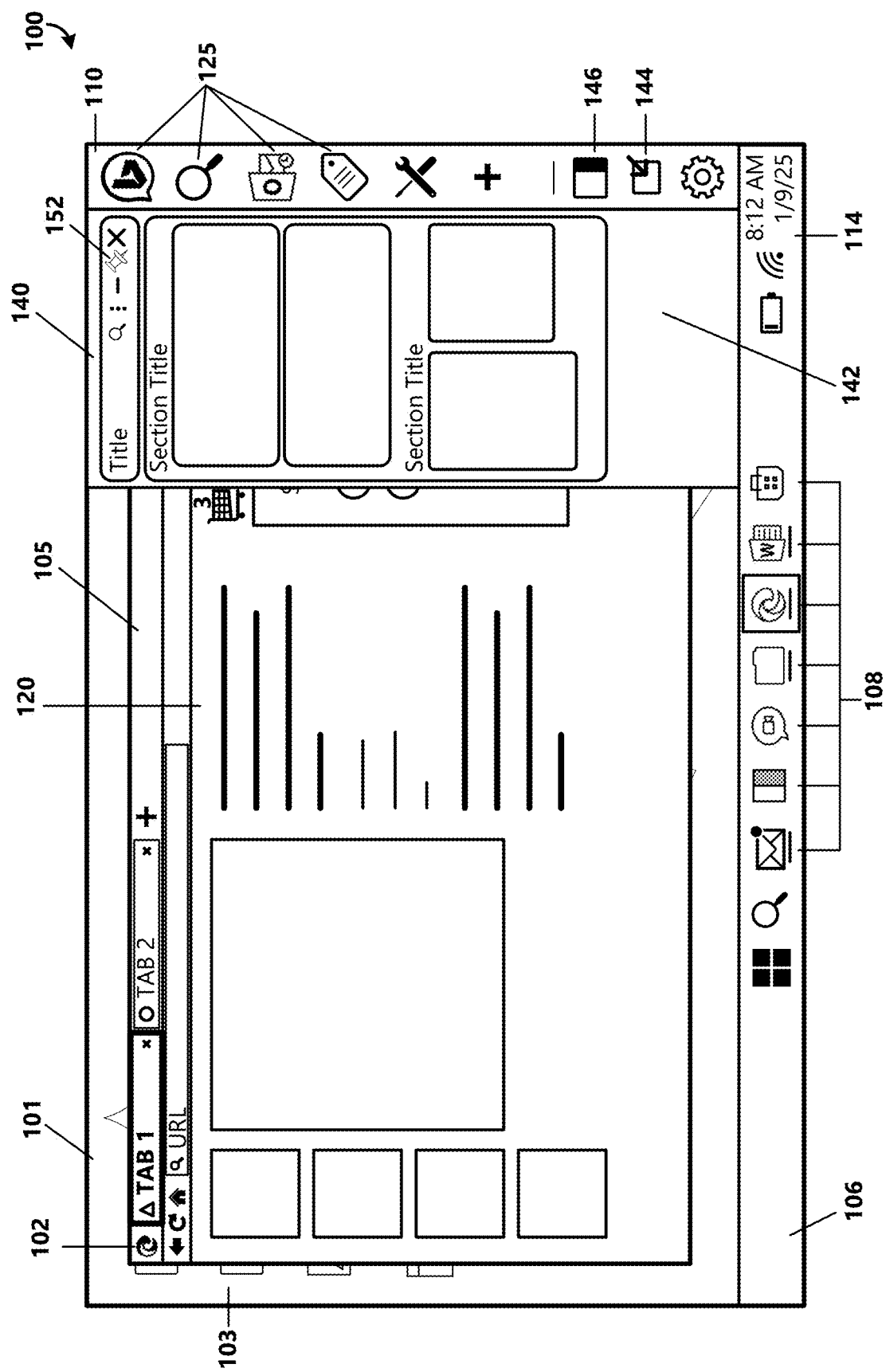
FIG. 1D depicts the sidebar frame extending from the sidebar and provided as an overlay in front of a workspace of the desktop according to an example.

With reference now to FIG. 1D, when the sidebar 110 is activated, the sidebar frame 140 expands out from the sidebar 110. For instance, the sidebar 110 is activated via a hover on or near the sidebar 110, a selection of an icon of the sidebar 110, a selection of a keyboard shortcut, a voice command, or the like. In some examples, the sidebar frame 140 is provided as an overlay in front of the workspace 103 of the desktop 101, where the sidebar frame 140 at least partially occludes a desktop application window 105 displayed in the workspace 103, such as the example web browser application window 105 depicted in FIG. 1D.

Figure 1E:
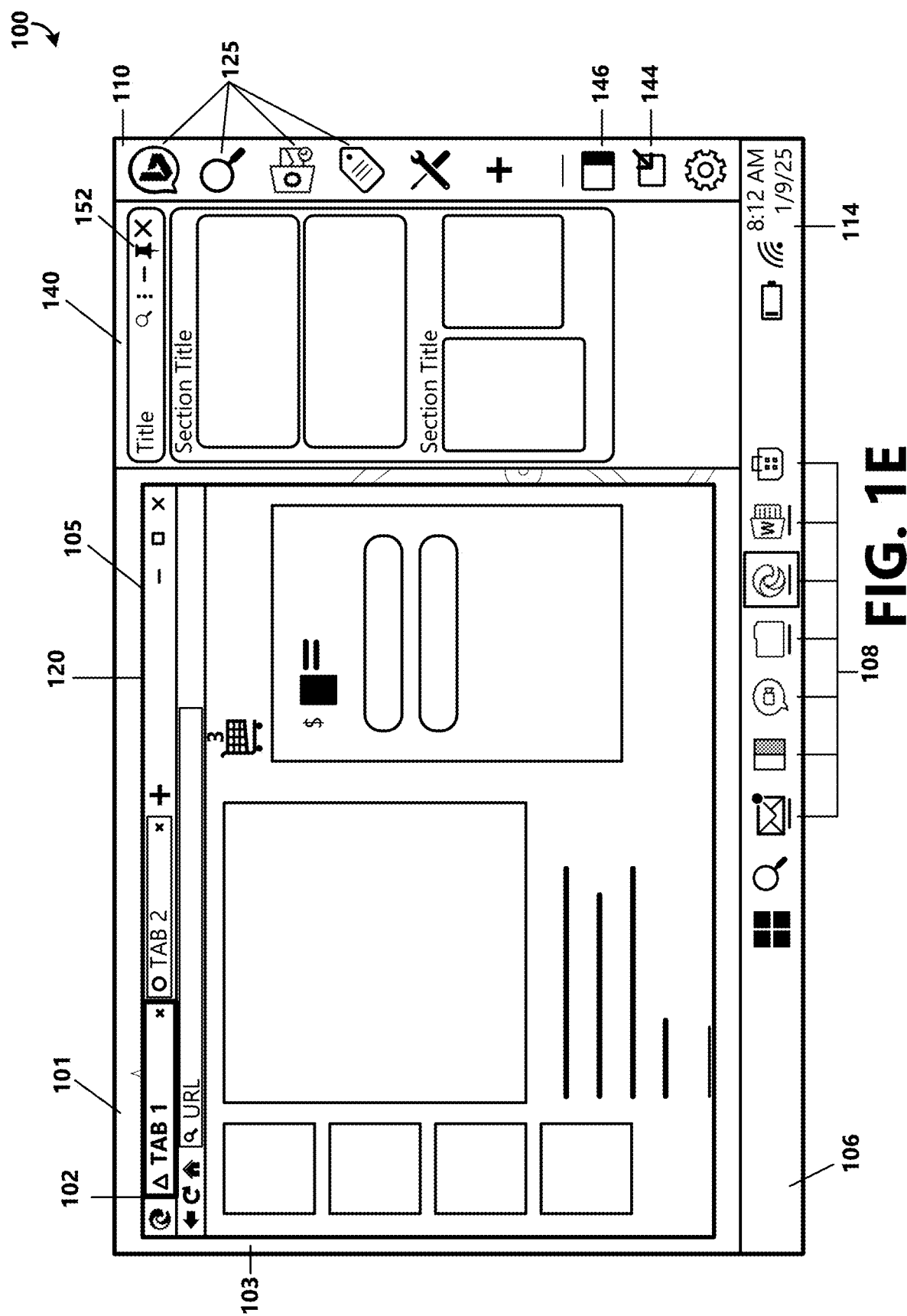
FIG. 1E depicts the sidebar frame pinned to the desktop according to an example.

The sidebar frame 140 may include a pin command 152 corresponding to a feature that toggles the sidebar frame 140 between an unpinned and a pinned state. For instance, in an unpinned state, the sidebar frame 140 is collapsed and expands out from the sidebar 110 when activated. When the pin command 152 is selected, the sidebar frame 140 is pinned in its expanded state to the desktop 101 as depicted in FIG. 1E. In some implementations, when the pin command 152 is selected, the desktop 101 is redrawn to create separate user interface zones for the workspace 103 and the sidebar frame 140 and prevent contextual web applications 125 presenting content 142 in the sidebar frame 140 from obscuring other desktop user interfaces (e.g., application windows 105) and enhance multitasking scenarios. For instance, when the sidebar frame 140 is pinned to a right or left side of the desktop 101, the workspace 103 shrinks horizontally such that the sidebar frame 140 and one or more frames/windows of desktop applications 108 are displayed concurrently. When the pin command 152 is selected and the sidebar frame 140 is in a pinned state (thereby unpinning the sidebar frame 140), the desktop 101 is redrawn and the sidebar frame 140 collapses and expands over the workspace 103 from the sidebar 110 when activated.

In some implementations, redrawing the desktop 101 is performed only when needed, such as when the sidebar 110 is docked or undocked or when the sidebar frame 140 is pinned or unpinned. Selectively triggering the redrawing of the desktop 101 conserves the significant graphics processing unit (GPU) resources required for redrawing. For instance, when redrawing the desktop 101, each application window 105, displayed and minimized, is redrawn in a sequential order, which is computationally expensive.

In some examples, when the sidebar 110 is detached from the web browser application window 105 and attached to the desktop 101, the contextual web applications 125 in the sidebar 110 maintain awareness of browsing activity in the web browser application window 105 and provide context-specific services for any web browser application window 105, when available. Additionally, the contextual web applications 125 in the sidebar 110 may also be able to interface with and provide context-aware services for non-browsing desktop applications 108. For instance, when the user opens or interacts with a non-browser desktop application 108, the application window 105 of the non-browser desktop application 108 becomes the active frame/window. The active window, for example, includes content for which contextual web applications 125 in the sidebar 110 may receive context. In other examples, however, the sidebar 110 may be configured or restricted to receive context from only web-browser applications, and the context may be provided from the currently active web browser window or the last-active web browser window. For instance, in such examples, a non-browser desktop application window may be the active window, and the context that is provided to the sidebar 110 is context from the last-active web browser window (e.g., the web browser window that most recently the active window).

Figure 1F:
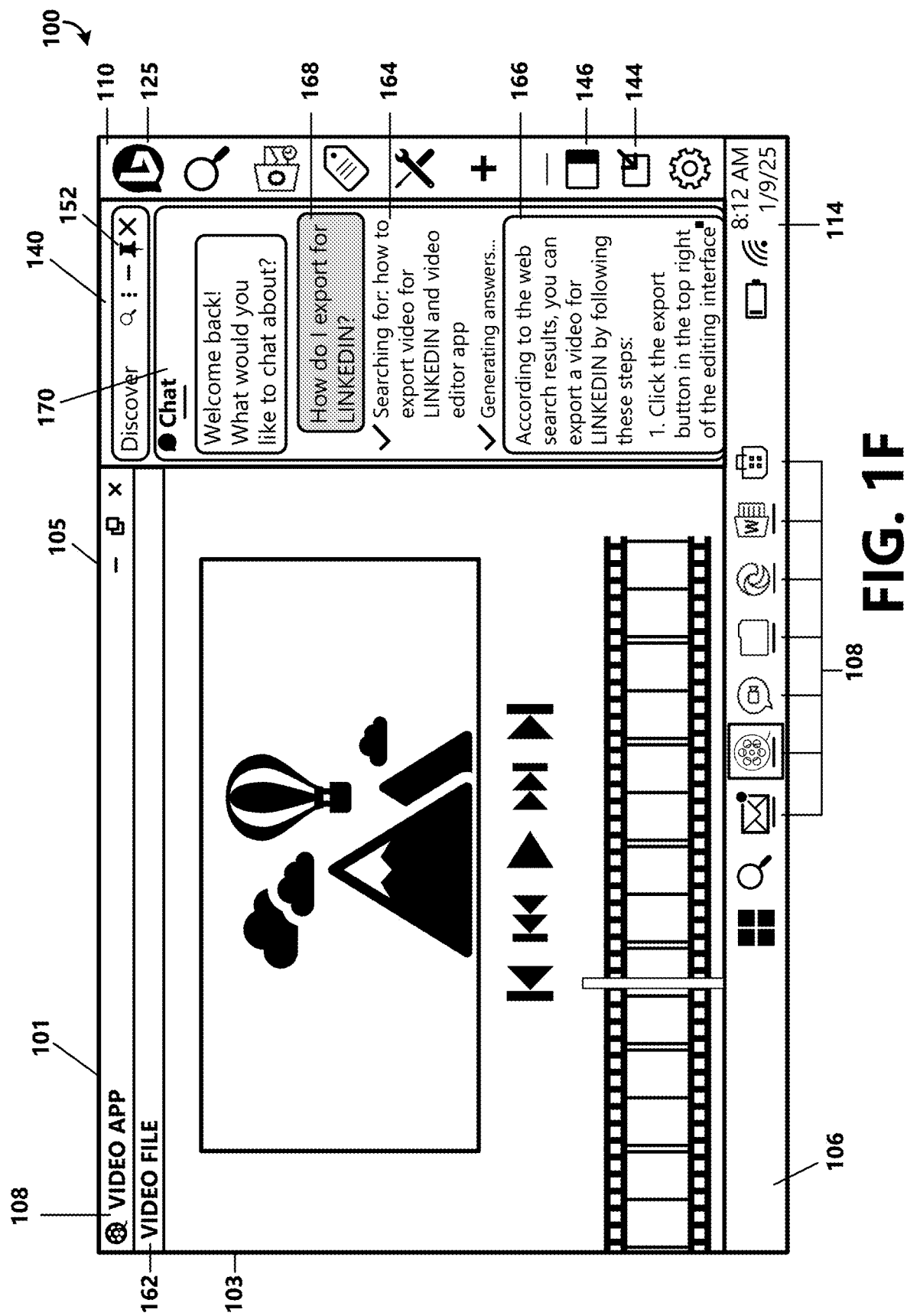
FIG. 1F depicts context about content in a desktop application window being used by a contextual web application to present information in the sidebar frame according to an example.

As an illustrative example of context being utilized from a non-browsing application, and as depicted in FIG. 1F, a video file 162 is being edited in a video editor application 108. When the sidebar 110 is docked to the desktop 101, the chatbot contextual web application 125 receives context about content being presented by the video editor application 108, such as information about the video file, based on file metadata, search terms, image content recognition (e.g., objects recognized in images, video content recognition (e.g., text from subtitles, objects recognized in video), and/or other data extracted from other content included in the video editor application window 105. The chatbot contextual web application 125 uses the received context about the content in formulating a prompt 164 and/or answer 166 to a question 168 input by the user via the conversational interface 170. For instance, a response to the question, "How do I export this to LINKEDIN?" includes an answer corresponding to how to export the video file the user is editing to the LINKEDIN networking site.

In other examples, other web applications are registered with the web browser 102 and included in the sidebar 110. For example, a web-based mail application (such as the MICROSOFT OUTLOOK application) and a web-based collaboration application (such as a MICROSOFT TEAMS application) are registered as web applications with the web browser 102. As an example, when the mail application icon is selected, the sidebar frame 140 is populated with data from the mail application. For example, the sidebar frame 140 may be populated with e-mail and/or calendaring data for the user even when the corresponding desktop application is not open. As another example, when the collaboration application icon is selected, the sidebar frame 140 may be populated with messages that have been received and/or sent by the user, such as a conversation between the user and other users. The user is then able to interact with the application directly through the sidebar frame 140. For instance, the user is able to send messages or contribute to a conversation occurring in the collaboration application without having to leave the desktop application 108 (e.g., the video editor application 108). In some examples, desktop notifications associated with one or more desktop applications 108 or the operating system are presented in the sidebar frame 140 when the sidebar frame 140 is docked to the desktop 101.

Figure 1G:
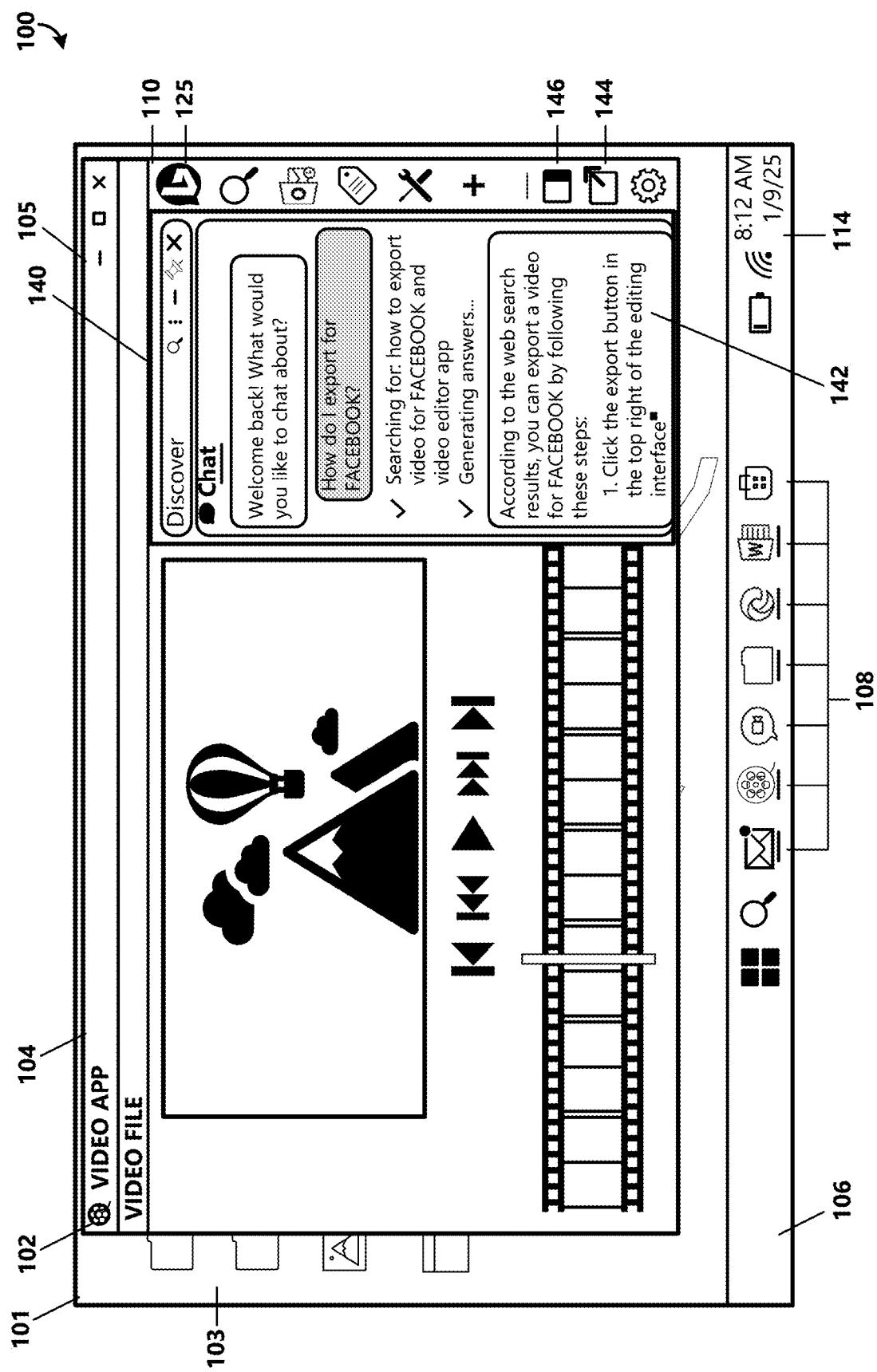
FIG. 1G depicts that the sidebar can be selectively detached from the desktop and attached to a desktop application window.

Detaching the sidebar 110 from the desktop 101 be accomplished by a selection of the detachment command 144 or via interactions other than a selection of the detachment command 144. For instance, as depicted in FIG. 1G, the sidebar 110 may be selectively dragged from the desktop 101 to a desktop application window 105 to detach the sidebar 110 from the desktop and attach the sidebar 110 to the desktop application window 105 (which may be a web browser or non-browser window). As a result, contextual web applications 125 in the sidebar 110 can be used in conjunction with context about content in the application window 105 of the selected desktop application 108. Additionally, when the sidebar 110 is detached from the desktop 101, the desktop 101 is redrawn to compensate for the undocking of the sidebar 110. For instance, the workspace 103 responsively expands (e.g., resizes and repositions) to fill the space of the web browser application window 105 previously occupied by the sidebar 110 (and sidebar frame 140 when pinned to the desktop 101).

Figure 2:
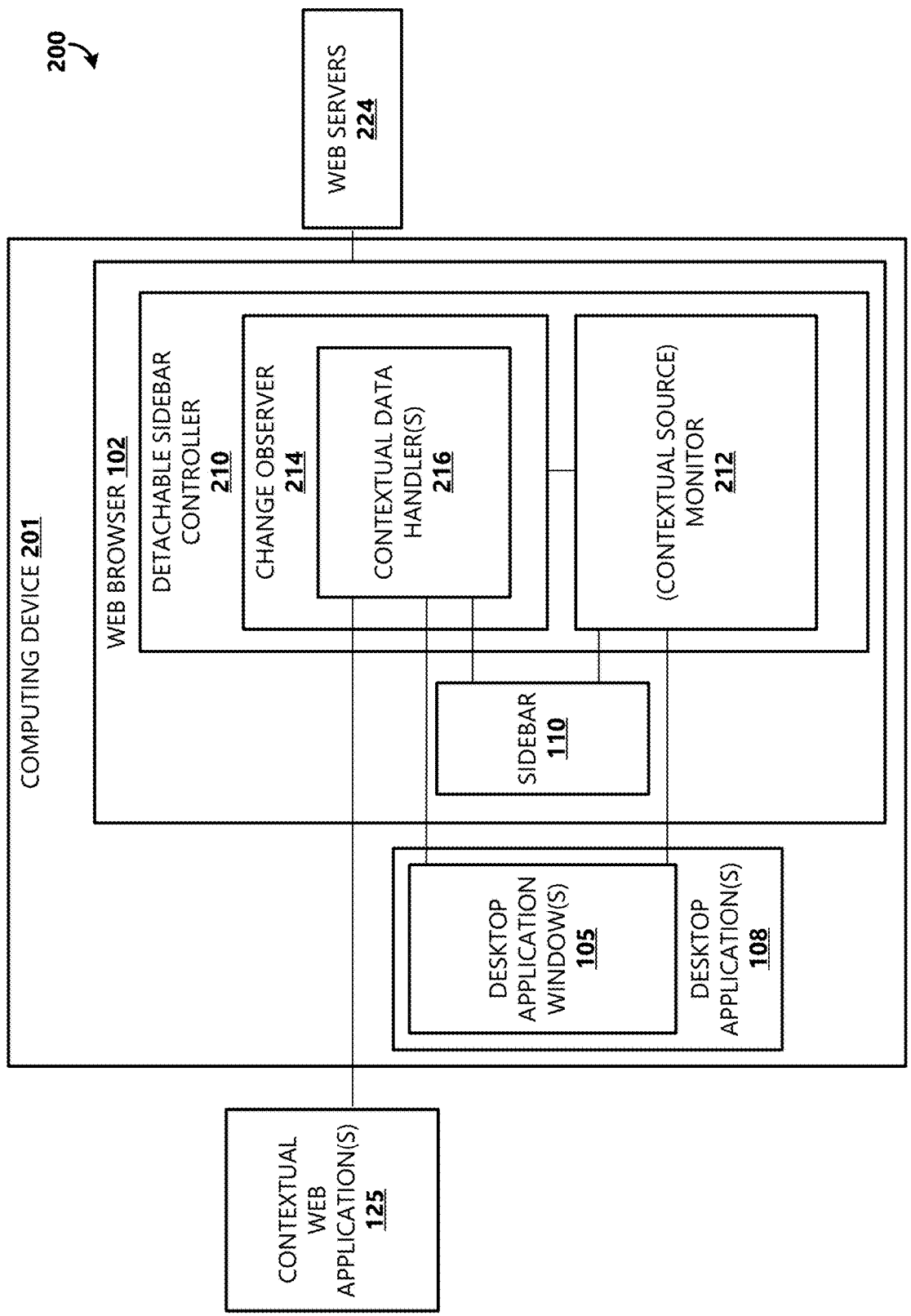
FIG. 2 depicts an example system for implementing the framework for providing a detachable browser interface for context-aware web services.

FIG. 2 depicts an example system 200 for implementing the framework for providing a detachable browser interface for context-aware web services. A web browser 102 includes web browsing and display functionality that controls the retrieval and display of web pages 116 from remote sources, such as web servers 224. For instance, when a web page 116 is requested via a URL, the web browsing and display functionality receives the web page content from a web server 224 and displays the content in the web browser 102. The web browser 102 further includes a detachable sidebar controller 210 including a contextual source monitor (herein referenced as monitor 212), a contextual source data handler (herein referenced as contextual data handler 216), and a contextual source change observer (herein referenced as change observer 214).

In some examples, the detachable sidebar controller 210 controls an exchange of data between one or more contextual web applications 125 and the web browser 102. The detachable sidebar controller 210 is a set or subset of computing code that causes or controls some of the operations discussed herein relating to communication between the web browser 102 and the contextual web applications 125. In some examples, the detachable sidebar controller 210 and/or the contextual web applications 125 are shared across multiple windows or instances of the browser 102 having the same user profile (e.g., same user signed into the web browser 102).

Portions or functions of the contextual web applications 125 operate remotely from the computing device 102 on which the web browser 102 operates. For instance, the contextual web applications 125 may be hosted by a server or web server 224 and be accessed by a URL request, similar to the retrieval of web page 116. In some examples, one or more of the contextual web applications 125 are web pages 116 that are hosted in a special hosting view provided by the detachable sidebar controller 210 of the web browser 102, and those contextual web applications 125 provide experiences that are contextual to the content in the primary display area 120 of the active application window 105. In other examples, one or more of the contextual web applications 125 operate locally on the same computing device 201 on which the web browser 102 operates but still outside of the web browser 102 itself.

The monitor 212 monitors changes to an active application window 105. In some implementations, the monitor 212 may utilize the change observer 214 and detect "active window" change events. An "active window" refers to a currently open application window 105 with which the user is interacting or has most recently interacted. In some examples, the monitor 212 is further able to identify or detect changes to the active tab of a particular web browser window. For instance, within an active browser application window 105, there may be multiple tabs that contain different content or functionality, where the "active tab" in this context refers to the tab that is currently selected and displayed in the foreground of the active application window 105 (e.g., the user is actively interacting with the active tab's contents). Thus, a change observer 214 is added to receive notification of "active window" and "active tab" change events. In some examples, the change observer 214 is implemented as an application programming interface (API) that allows for contextual web applications 125 to subscribe to events corresponding to monitored changes to an active application window 105. When needed, user permission is granted to allow for one or more application windows 105 to be monitored for change events and for providing context about content to one or more contextual web applications 125.

In some examples, the contextual data handler 216 is implemented as an API that manages contextual data for contextual web applications 125 in the sidebar 110. For instance, the contextual data handler 216 allows for the context to be fed from an active application window 105 to one or more contextual web applications 125. The one or more contextual web applications 125 use that context to generate additional data that is communicated back to the web browser 102 and displayed within the sidebar 110 and/or sidebar frame 140, such as when the sidebar is detached from the web browser application window 105 and docked to the desktop 101.

In some implementations, a separate contextual data handler 216 instance is created or utilized in association with each open desktop application window 105 and implemented with the change observer 214, where the contextual data handler 216 receives notification of "active window" change events detected by the monitor 212. As an example, a first active application window 105 is a first web browser application window 105. When the user switches to and focuses on another application window 105, such as a second web browser application window 105, an email application window 105, a spreadsheet application window 105, or another desktop application window 105, the monitor 212 detects this change and notifies one or more contextual data handlers 216 of the "active window" change event.

In some examples, a contextual data handler 216 manages different types of contextual data. An example instance of a contextual data handler 216 extracts context from the web page(s) 116 that are displayed by the web browser 202. Another example instance of a contextual data handler 216 includes algorithms and/or ML models configured to extract a first type of context from a first application window 105, and a further example contextual data handler instance extracts a second type of context from a second application window 105. In some examples, text corresponding to entities is extracted from content displayed in an active application window 105 and categorized and/or classified according to a ML model and/or through named entity recognition (NER) algorithms. In some examples, the ML models include Open Neural Network Exchange (ONNX) ML models or the like. For instance, entities are extracted from the text, images, and other content of the file/document. The extracted entities and/or their classifications/categorizations are a type of context. Other types of context can be extracted from content displayed in an application window 105. For example, a smart find-in-page algorithm is configured with default search terms or configured with search terms received from one or more contextual web applications 125. Other context types may be based on user segmentation, browser history, cookies, regular expression (regex) queries, image content recognizers (e.g., objects recognized in images), video context recognizers (e.g., text from subtitles, objects recognized in video), and/or other data extracted from application content.

In some examples, when the contextual data handlers 216 are executed and the corresponding context is generated, the detachable sidebar controller 210 sends or pushes the context to the contextual web applications 125 that have requested the context. Accordingly, certain context is provided only to the contextual web applications 125 that have registered to receive that certain context. For example, a first context type is sent to a first contextual web application 125 that has registered to receive the first context type, but not to the second contextual web application 125 that has not.

Figure 3:
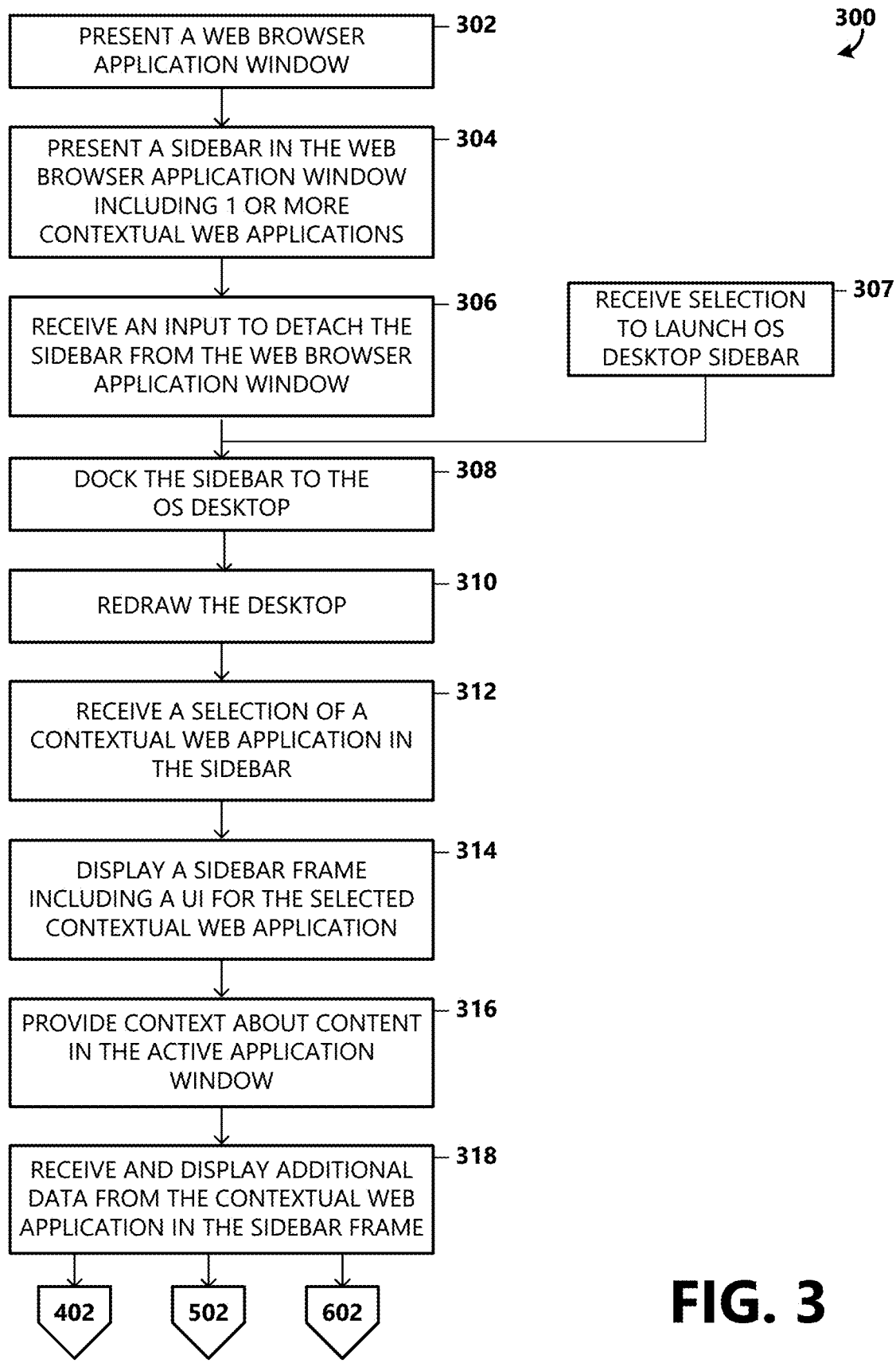
FIG. 3 depicts an example method for utilizing the framework for providing a detachable browser interface for context-aware web services.

FIG. 3 depicts an example method 300 for utilizing the framework for providing a detachable browser interface for context-aware web services. The operations of method 300 are performed by a computing device 201, such as a computing device hosting a web browser 102. In some examples, the operations are performed by the web browser 102. At operation 302, a web browser 102 is launched or executed, such as in response to a user selection of an icon corresponding to the web browser application 102/108 displayed in the operating system desktop 101. At operation 302, a web page 116 is loaded by the web browser 102. For example, the web browser 102 requests the web page 116 via the URL for the web page. When the content for the web page 116 is received by the web browser 102 from a web server 224, the web browser 102 displays the content of the web page 116 in a primary display area 120 of the web browser application window 105.

At operation 304, contextual web applications 125 registered with the web browser 102 and/or profile of the user signed into the web browser 102 are loaded by the web browser 102. For instance, the contextual web applications 125 include at least a first contextual web application 125 and a second contextual web application 125. In some examples, loading the contextual web applications 125 includes receiving a list of contextual web applications 125 and their respective manifests, where the sidebar controller 210 receives configuration data (e.g., manifests) for previously registered contextual web applications 125 and updates a user interface of the web browser 102 based on the loaded contextual web applications 125. For example, icons for the registered contextual web applications 125 are displayed in a sidebar 110 of the web browser application window 105. One or more contextual web applications 125 are subscribed to receive context of content displayed by an active application window 105.

At operation 306, an input is received to detach the sidebar 110 from the web browser application window 105. For instance, a selection of a detachment command 144 corresponding to a detached sidebar feature is received. In another example, the sidebar 110 is selected and dragged from the web browser application window 105 to the desktop 101.

In other examples, the desktop-docked version of the sidebar 110 may be launched from other starting points than a web browser application window 105. For example, at operation 307, a selection to launch the sidebar 110 as docked to the operating system desktop is received. The selection may be of a user interface element presented in the taskbar, a hot key combination, a voice command, or other type of input.

At operation 308, the sidebar 110 is docked to the desktop 101 of the operating system and detached from the web browser application window 105 (where applicable). For instance, the sidebar 110 is docked to an edge of the desktop 101 corresponding to an edge of the web browser application window 105 from where the sidebar 110 was detached. In some examples, when multiple web browser application windows 105 are open, the sidebar 110 is detached from the multiple web browser application windows 105 with a detachment selection for any of the sidebars 110.

At operation 310, the desktop 101 is redrawn to create a separate user interface zone for the sidebar 110 and prevent the sidebar 110 from obscuring other desktop user interfaces. For instance, when the sidebar 110 is docked to a right or left side of the desktop 101, the workspace 103 of the desktop 101 shrinks horizontally such that the sidebar 110 and one or more desktop application windows 105 are displayed concurrently without the sidebar 110 obscuring the one or more desktop application windows 105.

At operation 312, a contextual web application 125 is activated. For instance, a selection of an icon in the sidebar 110 corresponding to the contextual web application 125 is received. In response, at operation 314, the sidebar controller 210 causes the sidebar frame 140 to be displayed, where the sidebar frame 140 includes a user interface for the selected contextual web application 125. As an illustrative example, if the contextual web application 125 chatbot includes chatbot functionality, the user interface includes a conversational interface presented in the sidebar frame 140. In some implementations, the sidebar frame 140 is provided as an overlay in front of the workspace 103 of the desktop 101, where the sidebar frame 140 at least partially occludes a desktop application window 105 displayed in the workspace 103.

At operation 316, context about content in the active application window 105 is provided to the selected contextual web application 125. For instance, a determination is made that a change of focus to another application window 105 has not been detected and, thus, that the web browser application window 105 is the currently active application window. Context of content that the contextual web application 125 is subscribed to receive that is included in the web page 116 displayed in the web browser application window 105 is provided to the contextual web application 125. For instance, the contextual web application 125 uses that context to generate additional data. In some examples, context is provided to a contextual web application 125 whether the contextual web application 125 is active or in the background, where the receipt of the extracted context causes a contextual web application 125 running in the background to activate.

At operation 318, the additional data is communicated back to the web browser 102 from the contextual web application 125 and displayed in the sidebar frame 140. As an illustrative example, the additional data displayed in the sidebar frame 140 includes a recommended question the user may want to ask the chatbot about content being displayed on the web page 116 with which the user is interacting. In examples, a question from the user is received in the chatbot interface, where the contextual web application 125 uses context of the web page 116 content to construct a generative-AI prompt for obtaining an answer to the user's question. The answer to the user's question may then be communicated to the web browser 102 from the contextual web application 125 and displayed in the sidebar frame 140.

Figure 4:
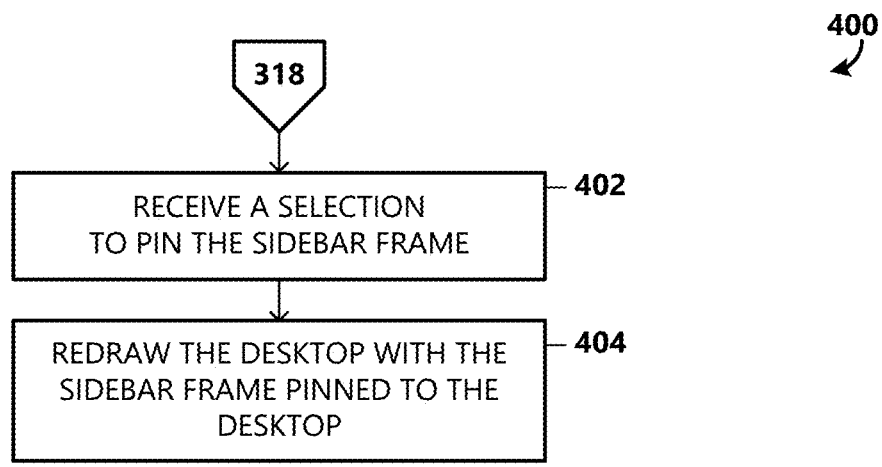
FIG. 4 depicts another example method for utilizing the framework for providing a detachable browser interface for context-aware web services.

In some examples, the method 300 optionally proceeds to operation 402 of method 400 depicted in FIG. 4. At operation 402, a selection is received to pin the sidebar frame 140 to the desktop 101. For instance, a pin command 152 is selected, where the pin command 152 corresponds to a feature that toggles the sidebar frame 140 between an unpinned and a pinned state.

At operation 404, the desktop 101 is redrawn to create separate user interface zones for the workspace 103 and the sidebar frame 140, and the sidebar frame 140 is pinned in its expanded state to the desktop 101. For instance, when the sidebar frame 140 is pinned to a right or left side of the desktop 101, the workspace 103 shrinks horizontally such that the sidebar frame 140 and one or more desktop application windows 105 are displayed concurrently without occlusion. When the pin command 152 is selected and the sidebar frame 140 is in a pinned state, the desktop 101 is redrawn and the sidebar frame 140 collapses (e.g., into the sidebar 110). When activated, the sidebar frame 140 expands over the workspace 103 from the sidebar 110.

Figure 5:
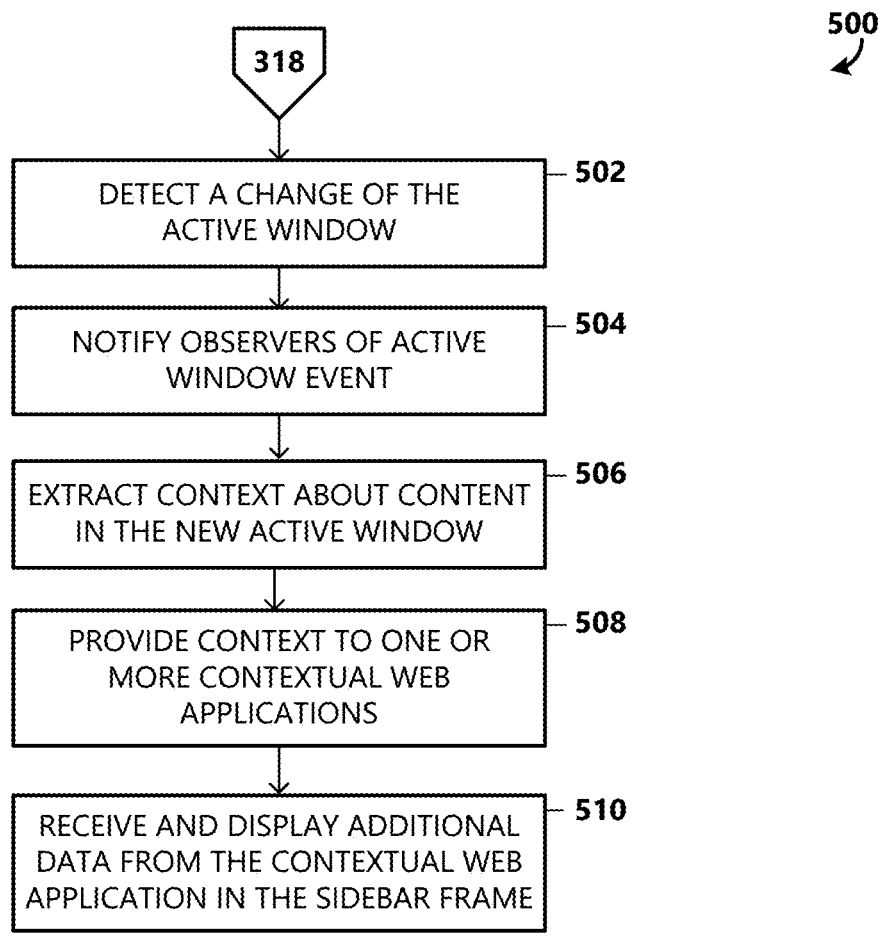
FIG. 5 depicts another example method for utilizing the framework for providing a detachable browser interface for context-aware web services.

Returning to method 300 and FIG. 3, in some examples, the method 300 optionally proceeds from operation 318 to operation 502 of method 500 depicted in FIG. 5. At operation 502, a change of the active window occurs. For instance, the user opens or changes focus to another desktop application 108. The monitor 212 detects the change at operation 502.

At operation 504, the monitor 212 notifies observers (e.g., one or more contextual data handlers 216) of the detected change. For instance, when the application window 105 of the other desktop application 108 becomes the active window, that change in the active window is detected and utilized to extract and deliver content from the new active window (or the last active web browser window, such as when the technology may not support context from some types of application windows 105). At operation 506, the one or more contextual data handlers 216 extract contextual data of content from the active application window 105.

At operation 508, the contextual data is provided to one or more contextual web applications 125 in the sidebar 110. At operation 510, additional data is determined by the contextual web application 125 and communicated to the sidebar 110 for display in the sidebar frame 140.

Figure 6:
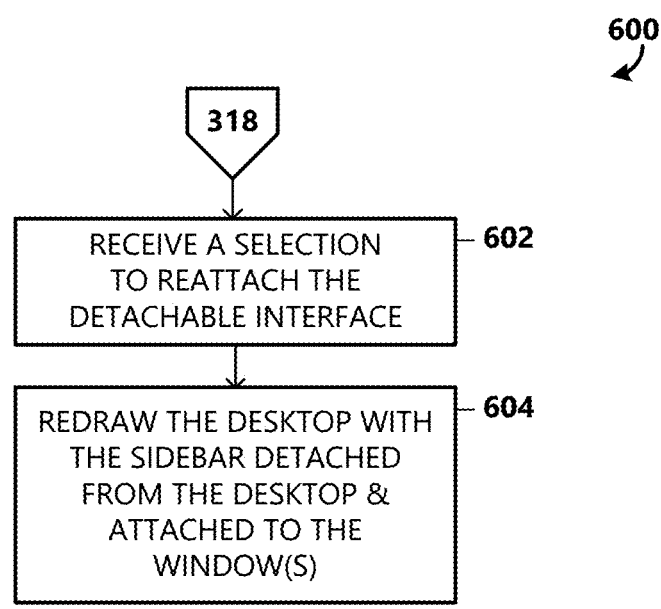
FIG. 6 depicts another example method for utilizing the framework for providing a detachable browser interface for context-aware web services.

Returning to method 300 and FIG. 3, in some examples, the method 300 optionally proceeds from operation 318 to operation 602 of method 600 depicted in FIG. 6. At operation 602, an indication of a selection to reattach the sidebar 110 to the web browser application window 105 is received. For instance, a selection of the detachment command 144 corresponding to the detached sidebar feature is received. In another example, the sidebar 110 is selected and dragged from the desktop 101 to the web browser application window 105.

At operation 604, the sidebar 110 is undocked from the desktop 101 and reattached to the web browser application window 105. In some examples, when multiple web browser application windows 105 are open, the sidebar 110 is reattached to each of the multiple web browser application windows 105. In further examples, the desktop 101 is redrawn to remove the separate user interface zone for the sidebar frame 140 from the desktop 101 and expand the workspace 103 to fill area previously occupied by the sidebar frame 140.

Figure 7A:
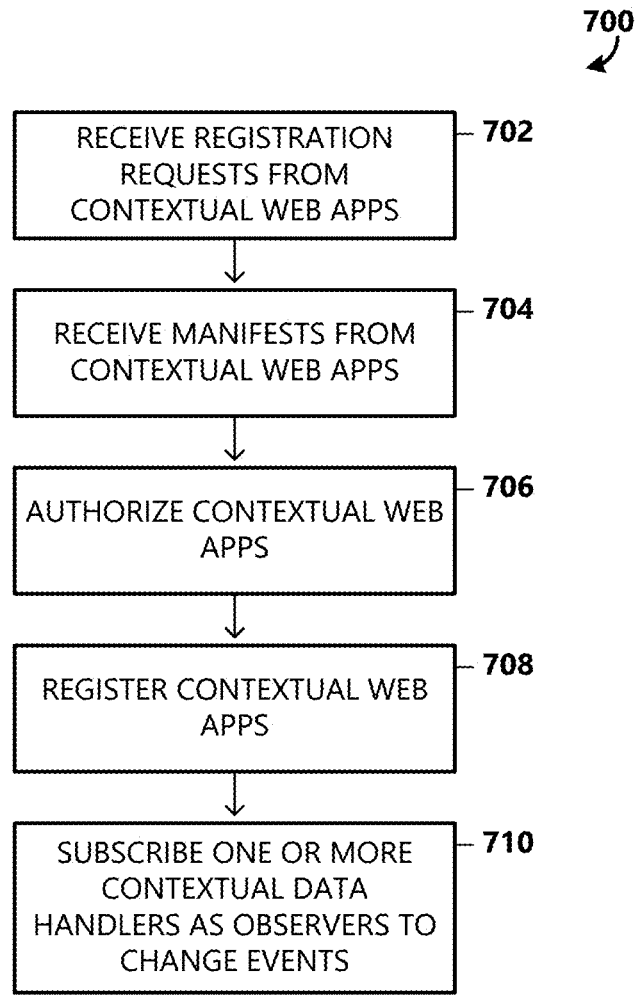
FIG. 7A depicts another example method for utilizing the framework for providing a detachable browser interface for context-aware web services.

FIG. 7A depicts an example method 700 for utilizing the framework for providing a detachable browser interface for context-aware web services. At operation 702, registration requests from contextual web applications 125 are received. As an example, a registration request may be received from a first contextual web application 125 and a second contextual web application 125. The registration request is in response to a user selecting the contextual web applications 125 for addition to the sidebar 110.

At operation 704, manifests for the contextual web applications 125 are received. For example, a first manifest from the first contextual web application 125 and a second manifest from the second contextual web application 125 are received. The manifests include various types of configuration data, such as the name of the contextual web application 125, an icon for the contextual web application 125, requested context types, capabilities of the contextual web application 125, etc.

At operation 706, the contextual web applications 125 that meet authorization criteria are authorized. For instance, a determination may be made as to whether the contextual web application 125 is authorized based on the data in the manifest, such as security certificates or other predefined security requirements. In some examples, authorization criteria is based on the web browser version and capabilities along with user preferences. As an example, if the manifest includes a capability of the contextual web application 125 that is indicated as being required, but the web browser 102 version does not support such a capability, the contextual web application 125 will not be authorized for that particular web browser 102.

Once the contextual web applications 125 are authorized in operation 706, the contextual web applications 125 are registered with the web browser 102 and/or a user profile at operation 708. In some examples, the contextual web applications 125 are registered with a manifest delivery service that maintains a list of the authorized and registered contextual web applications 125. The list of registered contextual web applications 125 is associated with the user profile of the user that added the particular contextual web applications 125 and/or with which the contextual web applications 125 are associated. Accordingly, when a user logs into a web browser 102, even on different computing devices 201, the list of registered contextual web applications 125 is retrieved and incorporated into the respective web browser 102 on the device 201.

At operation 710, one or more instances of contextual data handlers 216 are created and included as change observers 214 to change events detected by the monitor 212. For example, the one or more contextual data handlers 216 are notified of changes to the active application window 105. For instance, when a change to the active application window 105 is detected, the one or more contextual data handlers 216 are notified and respond accordingly. One example response includes extracting context of content in the active application window 105 and provided to the contextual data to one or more web applications 125.

Figure 7B:
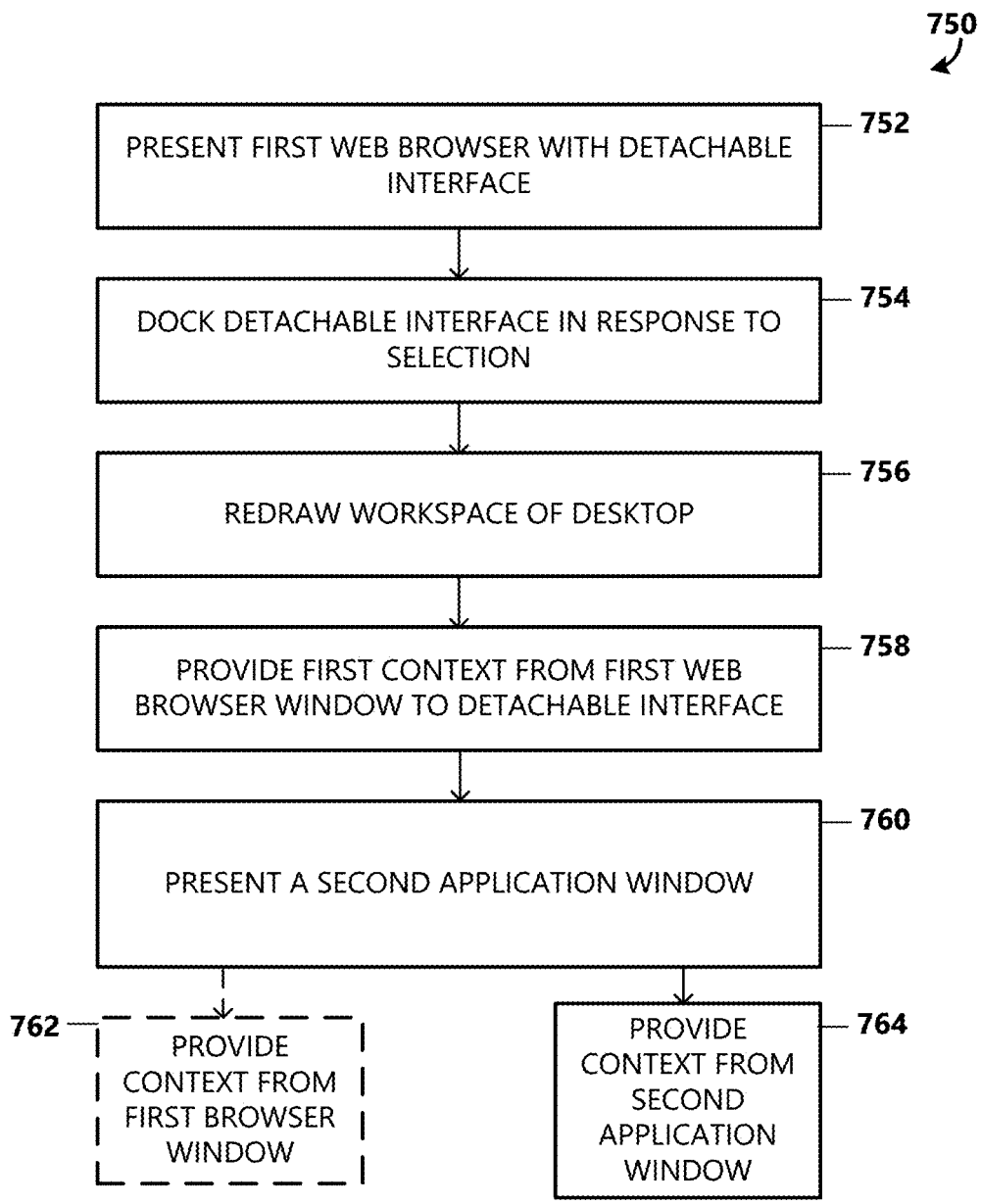
FIG. 7B depicts another example method for utilizing the framework for providing a detachable browser interface for context-aware web services.

FIG. 7B depicts another example method 750 for utilizing the framework for providing a detachable browser interface for context-aware web services. At operation 752, a first web browser window is presented with a detachable interface, such as a sidebar. The first web browser window may present first web content, such as content from a first website.

At operation 754, a selection to dock the detachable interface is received, and in response to the selection, the detachable interface is docked to the operating system desktop. The selection input may be the selection of a user interface element displayed within the detachable browser. In other example, the selection may be a hot key combination, voice input, and/or or a selection of another user interface element displayed within the desktop, such as in the taskbar. Docking the detachable interface may also include redrawing, at operation 756, the workspace of the desktop to compensate for the inclusion of the detachable interface.

At operation 758, first context based on the first web content in the first browser window is provided to the detachable interface. That first context may then be used by the web applications provided in or hosted by the detachable interface.

At operation 760, a second application window is presented concurrently with the first web browser window. The second application may be another web browser window that is presented second web content, such as web content from a second website. In other examples, the second application window may be a non-browser application window displaying content other than web-based content.

While the detachable interface is docked to the desktop, either operation 762 or operation 764 may be performed based on the currently active window and/or the window type of the second application window. For instance, if the first web browser window remains the active window, the context continues to be provided from the first web browser window to the docked interface at operation 762. If the second application window is a web-browser window and is also the active application window, the context is provided from the second application window to the docked interface at operation 764 rather than the first web browser window. In some examples where the present technology is configured to generate context from non-browser application windows, the context is provided from the second application window while the second application window remains the active window. In other examples where the present technology is not configured to generate context from non-browser application windows, the context is provided by the last active web browser window. For instance, where the second application window is a non-browser window and is the active window, the context may still be provided by the first web browser window at operation 762. In some examples, the particular window from which the context is being provided may be highlighted on the display or otherwise distinguished from the other windows. For instance, a title bar may include an indicator and/or the frame of the window may glow or have another type of visual indicator.

As another example scenario where the technology supports context from web browser windows but not other types of windows, three windows may be displayed. Two of the windows may be web browser windows (Browser Window A and Browser Window B) and the third window is a non-browser window (Application Window C). The initial active window may be Browser Window A, and the context is generated and provided from Browser Window A. Three possible changes are then available:

Change 1: The user switches to Browser Window B to make Browser Window B be the active window. The change in active window is detected, and context is then provided from Browser Window B.

Change 2: The uses switches to Application Window C to make Application Window C the active window. The last active browser window, however, is Browser Window A, and the system may consider Browser Window A to still be the active browser window. Accordingly, the context continues to be provided from Browser Window A. A change in focus or active windows may still be detected and provided to the detachable interface.

Change 3: The user closes Browser Window A and Application Window C becomes the active window. In this change, the Browser Window A is removed as a possible source for context, and Browser Window B becomes the active browser even though Browser Window B is not the active window. Context is then provided from Browser Window B.

Figure 8:
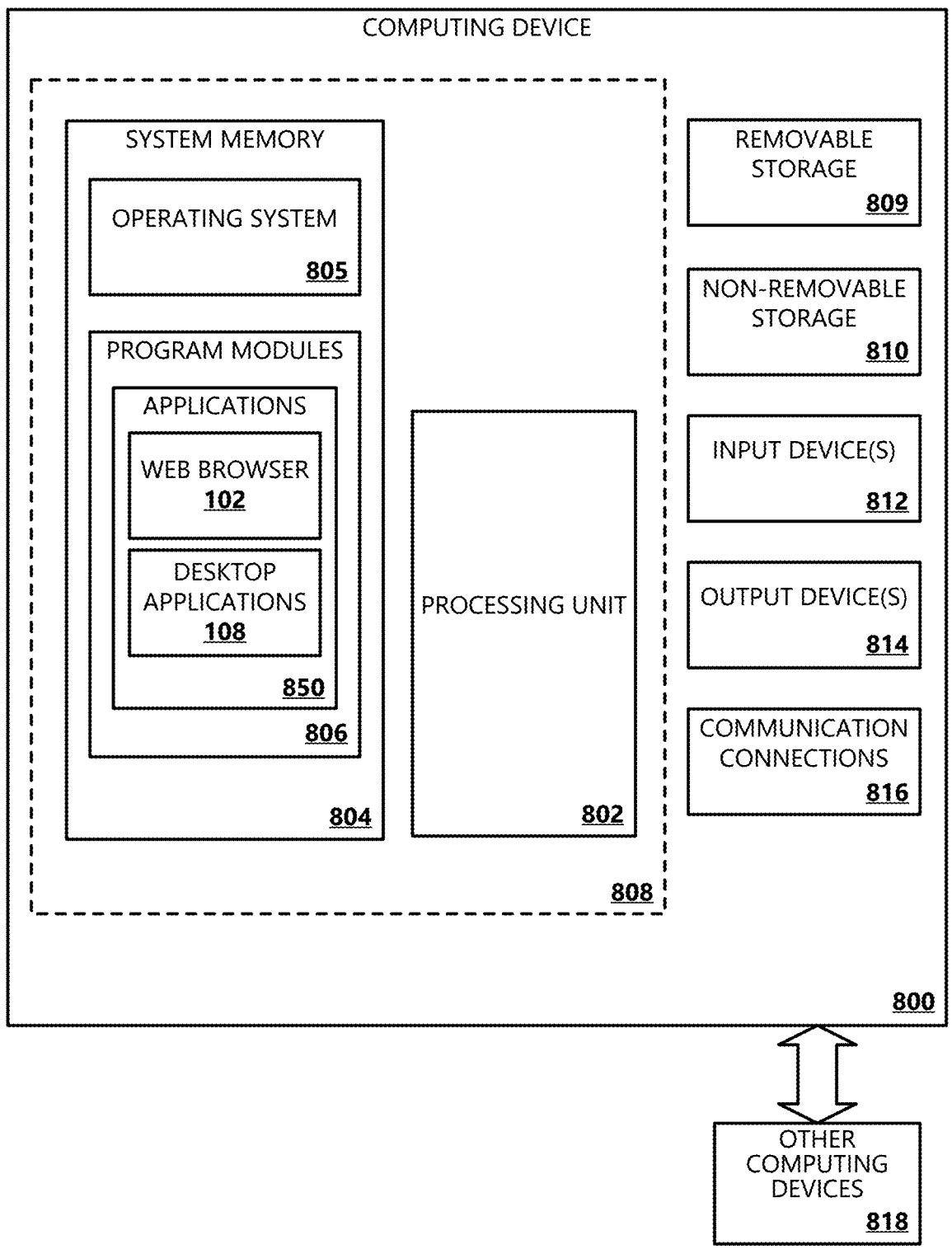
FIG. 8 is a block diagram illustrating example physical components of a computing device with which aspects of the technology may be practiced.

FIG. 8 and the associated description provide a discussion of a variety of operating environments in which examples of the invention may be practiced. However, the devices and systems illustrated and discussed with respect to FIG. 8 is for purposes of example and illustration and is not limiting of a vast number of computing device configurations that may be utilized for practicing aspects of the invention, described herein. FIG. 8 is a block diagram illustrating physical components (i.e., hardware) of a computing device 800 with which examples of the present disclosure may be practiced. The computing device components described below may be suitable for a client device running the web browser discussed above. In a basic configuration, the computing device 800 may include at least one processing unit 802 and a system memory 804. The processing unit(s) (e.g., processors) may be referred to as a processing system. Depending on the configuration and type of computing device, the system memory 804 may comprise, but is not limited to, volatile storage (e.g., random access memory), non-volatile storage (e.g., read-only memory), flash memory, or any combination of such memories. The system memory 804 may include an operating system 805 and one or more program modules 806 suitable for running software applications 850 such as a web browser 102 and one or more browser and/or non-browser desktop applications 108.

The operating system 805, for example, may be suitable for controlling the operation of the computing device 800. Furthermore, aspects of the invention may be practiced in conjunction with a graphics library, other operating systems, or any other application program and is not limited to any particular application or system. This basic configuration is illustrated in FIG. 8 by those components within a dashed line 808. The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by a removable storage device 809 and a non-removable storage device 810.

As stated above, a number of program modules and data files may be stored in the system memory 804. While executing on the processing unit 802, the program modules 806 may perform processes including, but not limited to, one or more of the operations of the methods illustrated in FIGS. 3-7. Other program modules that may be used in accordance with examples of the present invention and may include applications such as electronic mail and contacts applications, word processing applications, spreadsheet applications, database applications, slide presentation applications, drawing or computer-aided application programs, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to generating suggested queries, may be operated via application-specific logic integrated with other components of the computing device 800 on the single integrated circuit (chip). Examples of the present disclosure may also be practiced using other technologies capable of performing logical operations such as, for example, AND, OR, and NOT, including but not limited to mechanical, optical, fluidic, and quantum technologies.

The computing device 800 may also have one or more input device(s) 812 such as a keyboard, a mouse, a pen, a sound input device, a touch input device, etc. The output device(s) 814 such as a display, speakers, a printer, etc. may also be included. The aforementioned devices are examples and others may be used. The computing device 800 may include one or more communication connections 816 allowing communications with other computing devices 818. Examples of suitable communication connections 816 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 804, the removable storage device 809, and the non-removable storage device 810 are all computer storage media examples (i.e., memory storage.) Computer storage media may include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. Any such computer storage media may be part of the computing device 800. Computer storage media does not include a carrier wave or other propagated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

In an aspect, the technology relates to a computer-implemented method for controlling a detachable browser interface for context-aware web services, comprising: presenting, in a first web browser application window displaying first web content, a detachable interface including a contextual web application; in response to receiving an input to detach the detachable interface: docking the detachable interface with a desktop of an operating system; and redrawing a workspace of the desktop to compensate for the docked detachable interface; and providing, from the first web browser application window to the detachable interface docked to the desktop, first context about the first web content. In some examples, the computer-implemented method further comprises: presenting, concurrently with the first web browser application window, a second web browser application window displaying second web content; and while the detachable interface is docked to the desktop, providing second context about the second web content to the detachable interface docked to the desktop. In additional examples, the first context is provided while the first web browser application window is an active window; and the second context is provided while the second web browser application window is the active window. In further examples, the computer-implemented method further comprises: while the detachable interface is docked to the desktop, receiving an input to reattach the detachable interface; and in response to the input to reattach the detachable interface: undocking the detachable interface from the desktop; attaching the detachable interface to the first web browser application window and the second web browser application window; and redrawing the workspace of the desktop to compensate for the undocking of the detachable interface. In still further examples, the computer-implemented method further comprises: while presenting the first web browser application window, receiving a selection of a non-browser desktop application window as an active window; and while the non-browser desktop application window is the active window, continuing to provide the first context to the contextual web application. In additional examples, the computer-implemented method further comprises: while presenting the first web browser application window, receiving a selection of a non-browser desktop application window as an active window; and providing, from the non-browser desktop application window to the detachable interface docked to the desktop, second context about content in the non-browser desktop application window. In further additional examples, while the detachable interface is docked to the desktop the computer-implemented method further comprises: receiving a selection of the contextual web application from a plurality of contextual web applications; and presenting a sidebar frame as an overlay of the workspace, the sidebar frame including application content of the selected contextual web application, wherein the application content is generated based on the first context. In still further additional examples, desktop the computer-implemented method further comprises: receiving a selection to pin the sidebar frame; and in response to the selection to pin the sidebar frame, redrawing the desktop such that the sidebar frame does not occlude the workspace.

In an aspect, the technology relates to a system for providing a detachable browser interface for context-aware web services. The system includes a processing system; and memory storing instructions that, when executed by the processing system, cause the system to: receive a selection to launch a detachable interface including a plurality of contextual web applications; in response to receiving the selection: dock the detachable interface with a desktop of an operating system; and redraw a workspace of the desktop to compensate for the docked detachable interface; and provide context about content in a web browser application window in the workspace to the detachable interface docked to the desktop. In some examples, the system further comprises: while the detachable interface is docked to the desktop, receive an input to attach the detachable interface to the web browser application window; in response to the input to reattach the detachable interface: undock the detachable interface from the desktop; attach the detachable interface to the web browser application window; and redraw the workspace of the desktop to compensate for the undocking of the detachable interface. In further examples, the web browser application window is a first web browser application window displaying first web content and the instructions further cause the system to: display, concurrently with the first web browser application window, a second web browser application window displaying second web content; and while the detachable interface is docked to the desktop, providing second context about the second web content to the detachable interface docked to the desktop. In still further examples, the first context is provided while the first web browser application window is an active window; and the second context is provided while the second web browser application window is the active window. In additional examples, the instructions further cause the system to: while presenting the first web browser application window, receive a selection of a non-browser desktop application window as an active window; and while the non-browser desktop application window is the active window, continue to provide the first context to the contextual web application. In further additional examples, the instructions further cause the system to: receive a selection of a non-browser desktop application window as an active window; and provide, from the non-browser desktop application window to the detachable interface docked to the desktop, second context about content in the non-browser desktop application window. In still further additional examples, while the detachable interface is docked to the desktop, the instructions further cause the system to: receive a selection of the contextual web application from the plurality of contextual web applications; and present a sidebar frame as an overlay of the workspace, the sidebar frame including application content of the selected contextual web application, wherein the application content is generated based on the first context. In yet still further additional examples, the instructions further cause the system to: receive a selection to pin the sidebar frame; and in response to the selection to pin the sidebar frame, redraw the desktop such that the sidebar frame does not occlude the workspace.

In an aspect, the technology relates to a computer-implemented method for controlling a detachable browser interface for context-aware web services, comprising: receiving a selection to launch a detachable interface including a plurality of contextual web applications; in response to receiving the selection: docking the detachable interface with a desktop of an operating system; and redrawing a workspace of the desktop to compensate for the docked detachable interface; and providing, from a web browser application window in the workspace, context about content in the web browser application window to the detachable interface docked to the desktop; while the detachable interface is docked to the desktop, receiving an input to attach the detachable interface to the web browser application window; in response to the input to reattach the detachable interface: undocking the detachable interface from the desktop; attaching the detachable interface to the web browser application window; and redrawing the workspace of the desktop to compensate for the undocking of the detachable interface. In some examples, the method further comprises: while the detachable interface is docked to the desktop, receiving a selection of a non-browser desktop application window as an active window; and providing, from the non-browser desktop application window to the detachable interface docked to the desktop, context about content in the non-browser desktop application window. In further examples, the method further comprises: while the detachable interface is docked to the desktop, receiving a selection of a contextual web application from the plurality of contextual web applications; and presenting a sidebar frame as an overlay of the workspace, the sidebar frame including application content of the selected contextual web application, wherein the application content is generated based on the context. In still further examples, the method further comprises: receiving a selection to pin the sidebar frame; and in response to the selection to pin the sidebar frame, redrawing the desktop such that the sidebar frame does not occlude the workspace.

Aspects of the present invention, for example, are described above with reference to block diagrams and/or operational illustrations of methods, systems, and computer program products according to aspects of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved. Further, as used herein and in the claims, the phrase "at least one of element A, element B, or element C" is intended to convey any of: element A, element B, element C, elements A and B, elements A and C, elements B and C, and elements A, B, and C.

The description and illustration of one or more examples provided in this application are not intended to limit or restrict the scope of the invention as claimed in any way. The aspects, examples, and details provided in this application are considered sufficient to convey possession and enable others to make and use the best mode of claimed invention. The claimed invention should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope of the claimed invention.

We claim:

1. A computer-implemented method for controlling a detachable browser interface for context-aware web services, comprising:
presenting, in a workspace of a desktop of an operating system, a first web browser application window that is displaying first web content, wherein the workspace is an area of the desktop where a plurality of application windows may be displayed, and the first web browser application window includes a detachable interface including a plurality of icons corresponding to web applications, the plurality of icons including an icon representing a contextual web application;
receiving an input to detach the detachable interface from within the first web browser application window;
in response to receiving the input to detach the detachable interface:
docking the detachable interface with the desktop; and
redrawing the workspace to compensate for the docked detachable interface, wherein redrawing the workspace includes resizing the workspace;
providing, from the first web browser application window to the detachable interface docked to the desktop, first context about the first web content;
receiving a selection of the icon representing the contextual web application; and
in response to receiving the selection of the icon, displaying a sidebar frame that includes content that is based on the first context.

2. The computer-implemented method of claim 1, further comprising:
presenting, concurrently with the first web browser application window, a second web browser application window displaying second web content; and
while the detachable interface is docked to the desktop, providing second context about the second web content to the detachable interface docked to the desktop.

3. The computer-implemented method of claim 2, wherein:
the first context is provided while the first web browser application window is an active window; and
the second context is provided while the second web browser application window is the active window.

4. The computer-implemented method of claim 2, further comprising:
while the detachable interface is docked to the desktop, receiving an input to reattach the detachable interface; and
in response to the input to reattach the detachable interface:
undocking the detachable interface from the desktop;

attaching the detachable interface to the first web browser application window and the second web browser application window; and redrawing the workspace of the desktop to compensate for the undocking of the detachable interface.

5. The computer-implemented method of claim 1, further comprising:

while presenting the first web browser application window, receiving a selection of a non-browser desktop application window as an active window; and while the non-browser desktop application window is the active window, continuing to provide the first context to the contextual web application.

6. The computer-implemented method of claim 1, further comprising:

while presenting the first web browser application window, receiving a selection of a non-browser desktop application window as an active window; and providing, from the non-browser desktop application window to the detachable interface docked to the desktop, second context about content in the non-browser desktop application window.

7. The computer-implemented method of claim 1, while the detachable interface is docked to the desktop, further comprising:

receiving a selection of the contextual web application from a plurality of contextual web applications; and presenting a sidebar frame as an overlay of the workspace, the sidebar frame including application content of the selected contextual web application, wherein the application content is generated based on the first context.

8. The computer-implemented method of claim 7, further comprising:

receiving a selection to pin the sidebar frame; and in response to the selection to pin the sidebar frame, redrawing the desktop such that the sidebar frame does not occlude the workspace.

9. A system for controlling a detachable browser interface for context-aware web services, the system comprising:

a processing system; and memory storing instructions that, when executed by the processing system, cause the system to:

receive a selection to launch a detachable interface, wherein the detachable interface includes a plurality of contextual web applications;

in response to receiving the selection:

dock the detachable interface with a desktop of an operating system; and redraw a workspace of the desktop to compensate for the docked detachable interface, wherein the workspace is an area of the desktop where application windows may be displayed and redrawing the workspace includes resizing the workspace; and provide first context about content in a web browser application window in the workspace to the detachable interface docked to the desktop.

10. The system of claim 9, further comprising:

while the detachable interface is docked to the desktop, receive an input to attach the detachable interface to the web browser application window;

in response to the input to reattach the detachable interface:

undock the detachable interface from the desktop;

attach the detachable interface to the web browser application window; and redraw the workspace of the desktop to compensate for the undocking of the detachable interface.

11. The system of claim 9, wherein the web browser application window is a first web browser application window displaying first web content and the instructions further cause the system to:

display, concurrently with the first web browser application window, a second web browser application window displaying second web content; and while the detachable interface is docked to the desktop, providing second context about the second web content to the detachable interface docked to the desktop.

12. The system of claim 11, wherein:

the first context is provided while the first web browser application window is an active window; and the second context is provided while the second web browser application window is the active window.

13. The system of claim 11, wherein the instructions further cause the system to:

while presenting the first web browser application window, receive a selection of a non-browser desktop application window as an active window; and while the non-browser desktop application window is the active window, continue to provide the first context to the contextual web application.

14. The system of claim 9, wherein the instructions further cause the system to:

receive a selection of a non-browser desktop application window as an active window; and provide, from the non-browser desktop application window to the detachable interface docked to the desktop, second context about content in the non-browser desktop application window.

15. The system of claim 9, wherein, while the detachable interface is docked to the desktop, the instructions further cause the system to:

receive a selection of the contextual web application from the plurality of contextual web applications; and present a sidebar frame as an overlay of the workspace, the sidebar frame including application content of the selected contextual web application, wherein the application content is generated based on the first context.

16. The system of claim 15, wherein the instructions further cause the system to:

receive a selection to pin the sidebar frame; and in response to the selection to pin the sidebar frame, redraw the desktop such that the sidebar frame does not occlude the workspace.

17. A computer-implemented method for controlling a detachable browser interface for context-aware web services, comprising:

presenting a workspace of a desktop of an operating system, wherein the workspace is an area of the desktop where a plurality of application windows may be displayed;

receiving a selection to launch a detachable interface, wherein the detachable interface includes a plurality of contextual web applications;

in response to receiving the selection:

docking the detachable interface with the desktop; and redrawing the workspace of the desktop to compensate for the docked detachable interface, wherein redrawing the workspace includes resizing the workspace; and providing, from a web browser application window in the workspace, context about content in the web browser application window to the detachable interface docked to the desktop;

while the detachable interface is docked to the desktop, receiving an input to attach the detachable interface to the web browser application window;

in response to the input to reattach the detachable interface:
  undocking the detachable interface from the desktop;
  presenting the detachable interface in the web browser application window; and
  redrawing the workspace of the desktop to compensate for the undocking of the detachable interface.

18. The computer-implemented method of claim 17, further comprising:

while the detachable interface is docked to the desktop, receiving a selection of a non-browser desktop application window as an active window; and providing, from the non-browser desktop application window to the detachable interface docked to the desktop, context about content in the non-browser desktop application window.

19. The computer-implemented method of claim 17, further comprising:

while the detachable interface is docked to the desktop, receiving a selection of a contextual web application from the plurality of contextual web applications; and presenting a sidebar frame as an overlay of the workspace, the sidebar frame including application content of the selected contextual web application, wherein the application content is generated based on the context.

20. The computer-implemented method of claim 19, further comprising:

receiving a selection to pin the sidebar frame; and in response to the selection to pin the sidebar frame, redrawing the desktop such that the sidebar frame does not occlude the workspace.

\* \* \* \* \*